US009883118B2

United States Patent
Chueh et al.

(10) Patent No.: US 9,883,118 B2
(45) Date of Patent: Jan. 30, 2018

(54) METHOD OF IMAGE CORRECTION AND IMAGE CAPTURING DEVICE THEREOF

(71) Applicant: HTC Corporation, Taoyuan (TW)

(72) Inventors: Hsin-Ti Chueh, Taoyuan (TW);
Jing-Lung Wu, Taoyuan (TW);
Fu-Chang Tseng, Taoyuan (TW);
Wei-Chih Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 358 days.

(21) Appl. No.: 14/609,432

(22) Filed: Jan. 30, 2015

(65) Prior Publication Data

US 2015/0271468 A1 Sep. 24, 2015

Related U.S. Application Data

(60) Provisional application No. 61/969,274, filed on Mar. 24, 2014.

(51) Int. Cl.
*H04N 13/02* (2006.01)
*G06K 9/62* (2006.01)
(Continued)

(52) U.S. Cl.
CPC .......... *H04N 5/2628* (2013.01); *G06T 7/33* (2017.01); *G06T 7/593* (2017.01); *H04N 13/0018* (2013.01); *H04N 13/0025* (2013.01); *H04N 13/025* (2013.01); *H04N 13/0239* (2013.01); *G06T 2207/10012* (2013.01); *H04N 2013/0081* (2013.01)

(58) Field of Classification Search
CPC .......... H04N 13/0207; H04N 5/2628; G06K 9/4604; G06K 9/6202; G06T 7/0051

USPC .......................................................... 348/46
See application file for complete search history.

(56) References Cited

U.S. PATENT DOCUMENTS

| 5,671,992 A | * | 9/1997 | Richards | G02B 27/225 |
| | | | | 348/E13.027 |
| 8,050,507 B2 | | 11/2011 | Chen | |
| 2007/0098290 A1 | * | 5/2007 | Wells | G06T 11/00 |
| | | | | 382/254 |
| 2013/0258057 A1 | | 10/2013 | Mishima | |

FOREIGN PATENT DOCUMENTS

| CN | 101567082 A | 10/2009 |
| CN | 102404595 A | 4/2012 |

(Continued)

OTHER PUBLICATIONS

Machine Translation of CN103329548.*

(Continued)

*Primary Examiner* — Hee-Yong Kim
(74) *Attorney, Agent, or Firm* — Winston Hsu

(57) ABSTRACT

A method for an image capturing device is disclosed. The method includes capturing a first image and a second image; adjusting a first resolution of the first image to a second resolution of the second image; cropping a first image part corresponding to the second image in the first image via comparing feature points between the first image and the second image, for generating a third image; detecting non-ideal effects between the second image and the third image; compensating the non-ideal effects, for generating a first corrected image and a second corrected image; and calculating a depth information based on the first corrected image and the second corrected image.

14 Claims, 7 Drawing Sheets

(51) Int. Cl.
*H04N 5/262* (2006.01)
*G06K 9/46* (2006.01)
*G06T 7/00* (2017.01)
*G06K 9/40* (2006.01)
*G03B 21/14* (2006.01)
*H04N 13/00* (2006.01)
*G06T 7/33* (2017.01)
*G06T 7/593* (2017.01)

(56) References Cited

FOREIGN PATENT DOCUMENTS

| | | |
|---|---|---|
| CN | 103329548 A | 9/2013 |
| CN | 103365063 A | 10/2013 |
| CN | 103444191 A | 12/2013 |
| TW | 201230773 | 7/2012 |
| TW | 201327472 | 7/2013 |

OTHER PUBLICATIONS

Office action dated Jul. 28, 2016 for the China application No. 201510049654.8, filed Jan. 30, 2015, p. 1-7.
Office action dated Sep. 25, 2015 for the Taiwan application No. 104103280, filed Jan. 30, 2015, p. 1-10.

* cited by examiner

IMG1

IP1

IMG2

IMG3

METHOD OF IMAGE CORRECTION AND IMAGE CAPTURING DEVICE THEREOF

CROSS REFERENCE TO RELATED APPLICATIONS

This application claims the benefit of U.S. Provisional Application No. 61/969,274, filed on Mar. 24, 2014 and entitled "Method of Image Correction and Image Capturing Device thereof", the contents of which are incorporated herein in their entirety.

BACKGROUND OF THE INVENTION

1. Field of the Invention

The present invention relates to a method of image correction and image capturing device thereof, and more particularly, to a method capable of adaptively compensating non-ideal effects each time of capturing images and the image capturing device thereof.

2. Description of the Prior Art

With progress of image technologies, functionalities of image capturing devices are increasingly diverse. One of the interesting functionalities is capturing three-dimensional (3D) images. Generally, the 3D images may be acquired by separately capturing two dimensional (2D) images via different image capturing units (such as cameras) at the same time and calculating the depth information of the 3D images according to the 2D images. However, the relationships of the 2D images may be affected by unexpected effects, resulting that the correct depth information cannot be acquired. For example, the configurations of the image capturing units may be changed after the image capturing device is impacted by an external force (e.g. the image capturing device drops and hits the ground), and the relationships between the images captured before the impact may be different from those between the images captured after the impact. In such a condition, the unexpected effects may affect the calculation of the depth information.

Thus, how to avoid the unexpected effects affect the calculation of the depth information becomes an issue to be discussed.

SUMMARY OF THE INVENTION

In order to solve the above problem, the present invention discloses a method capable of adaptively compensating the non-ideal effects each time of capturing the images and the image capturing device thereof.

An embodiment discloses a method for an image capturing device, comprising capturing a first image and a second image; adjusting a first resolution of a first image to a second resolution of a second image; cropping a first image part corresponding to the second image in the first image via comparing feature points between the first image and the second image, for generating a third image; detecting non-ideal effects between the second image and the third image; compensating the non-ideal effects, for generating a first corrected image and a second corrected image; and calculating a depth information based on the first corrected image and the second corrected image.

An embodiment further discloses an image capturing device, comprising a computing unit; and a storage unit, for storing a program code used for instructing the computing unit to perform the following steps: capturing a first image and a second image; adjusting a first resolution of a first image to a second resolution of a second image; cropping a first image part corresponding to the second image in the first image via comparing feature points between the first image and the second image, for generating a third image; detecting non-ideal effects between the second image and the third image; compensating the non-ideal effects, for generating a first corrected image and a second corrected image; and calculating a depth information based on the first corrected image and the second corrected image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
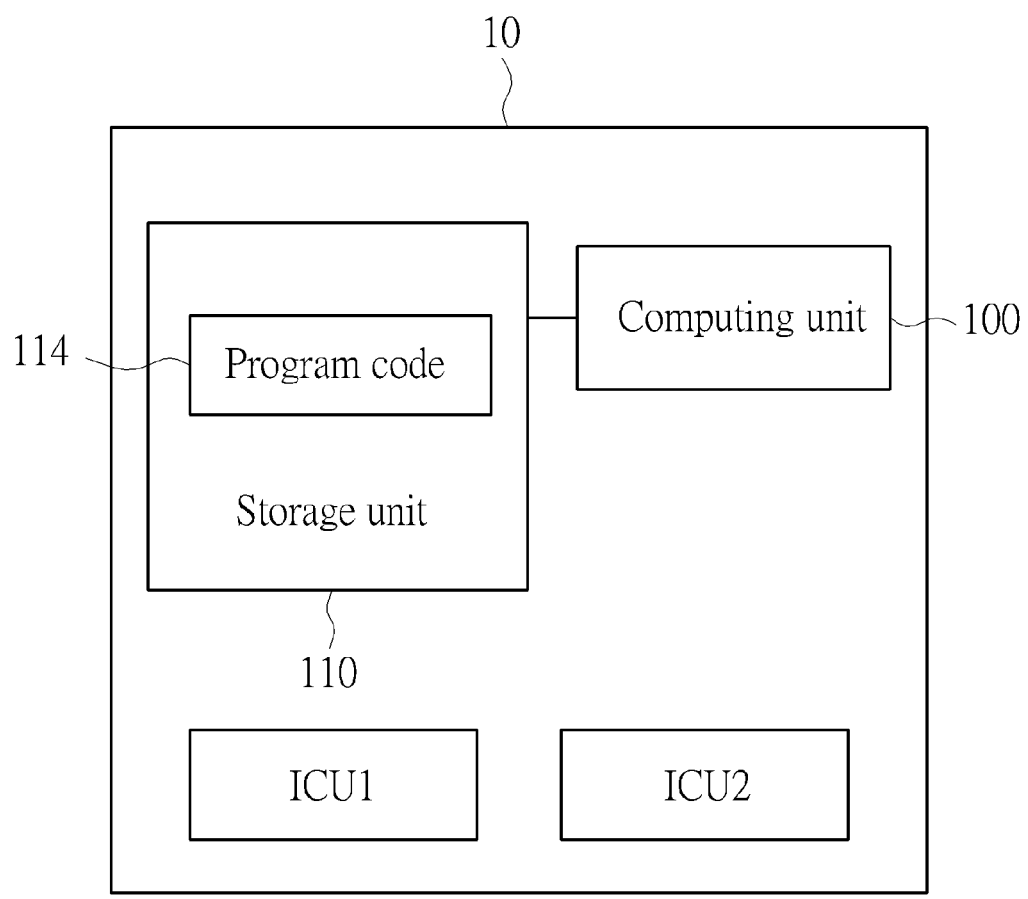
FIG. 1 is a schematic diagram of an image capturing device according to an example of the present invention.

Please refer to FIG. 1, which is a schematic diagram of an image capturing device 10 according to an example of the present invention. The image capturing device 10 is utilized for acquiring three-dimensional (3D) images and depth information. In this example, the image capturing device 10 comprises a computing unit 100, a storage unit 110 and image capturing units ICU1 and ICU2. The computing unit 100 may be a microprocessor, an Application Specific Integrated Circuit (ASIC), etc. The storage unit 110 may be any data storage device that can store a program code 114 and is accessible by the computing unit 100. Examples of the storage unit 110 include, but are not limited to, a subscriber identity module (SIM), read-only memory (ROM), flash memory, random-access memory (RAM), CD-ROM/DVD-ROM, magnetic tape, hard disk, and an optical data storage device. The image capturing units ICU1 and ICU2 are utilized for capturing images used for acquiring the 3D images and depth information.

Figure 2:
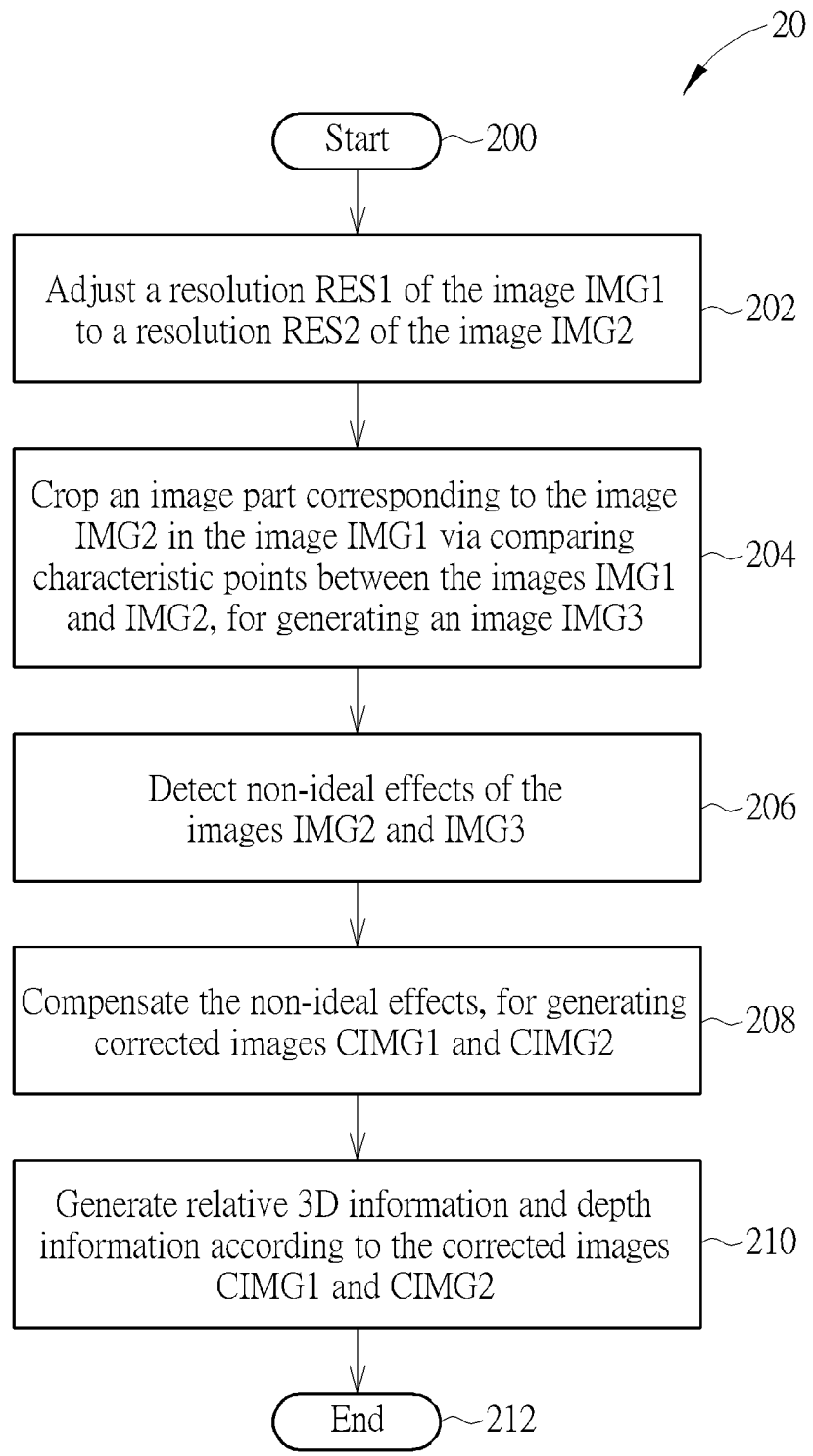
FIG. 2 is a flowchart of a method according to an example of the present invention.

Please refer to FIG. 2, which is a flow chart of a method 20 according to an example of the present invention. The method 20 is utilized in the image capturing device 10 for compensating non-ideal effects of images IMG1 and IMG2 used for acquiring depth information of a 3D image. Note that, the images IMG1 and IMG2 may be acquired by different image capturing units with different resolutions (e.g. the image capturing units ICU1 and ICU2), and are not limited herein. The method 20 can be complied into the program code 114 and comprise the following steps:

Step 200: Start.

Step 202: Adjust a resolution RES1 of the image IMG1 to a resolution RES2 of the image IMG2.

Step 204: Crop an image part corresponding to the image IMG2 in the image IMG1 via comparing feature points between the images IMG1 and IMG2, for generating an image IMG3.

Step 206: Detect non-ideal effects of the images IMG2 and IMG3.

Step 208: Compensate the non-ideal effects, for generating corrected images CIMG1 and CIMG2.

Step 210: Generate relative 3D information and depth information according to the corrected images CIMG1 and CIMG2.

Step 212: End.

According to the method 20, the image capturing device 10 first acquires (e.g. captures) the images IMG1 and IMG2 via the image capturing units ICU1 and ICU2, separately. In this example, the image capturing units ICU1 and ICU2 are transversely configured when capturing the images IMG1 and IMG2. That is, the image capturing unit ICU1 may be located at the left side of the image capturing unit ICU2 as shown in FIG. 1 when capturing the images IMG1 and IMG2, and is not limited herein. For example, the image capturing unit ICU1 may be changed to be located at the lower left side of the image capturing unit ICU2 when capturing the images IMG1 and IMG2. Since the image capturing units ICU1 and ICU2 may have different resolutions, the resolution RES1 of the image IMG1 may be different from the resolution RES2 of the image IMG2. In order to perform the following process, the resolution RES1 and RES2 need to be the same. For example, the image capturing device 10 may downscale or upscale the images IMG1 for making the resolution RES1 to be the same with the resolution RES2 when the resolution RES1 is greater or smaller than the resolution RES2. As such, the images IMG1 and IMG2 have the same resolution after adjusting the resolution RES1.

Next, via comparing the feature points between the images IMG1 and IMG2, the image capturing device 10 recognizes which part of the image IMG1 is corresponding to the image IMG2 (i.e. which parts of the image IMG1 and the image IMG2 have similar feature points) and crops the part corresponding to the image IMG2 in the image IMG1 as the image IMG3. Since the images IMG2 and IMG3 have the same resolution and the approximately same view angle, the image capturing device 10 can detect and compensate the non-ideal effects (e.g. shifts and distortions) of the images IMG2 and IMG3, for generating the corrected images CIMG1 and CIMG2. After compensating the non-ideal effects, the image capturing device 10 may therefore generate relative 3D information and calculate correct depth information (e.g. a depth map) according to the corrected images CIMG1 and CIMG2.

As to details of the method 20, please refer to the following example. Please refer to FIG. 3, which is a schematic diagram of images IMG1 and IMG2 according to an example of the present invention. In this example, the images IMG1 and IMG2 have different resolutions and sizes. Thus, the image capturing device 10 first downscales the resolution RES1 of the image IMG1 to make the resolution RES1 be the same with the resolution RES2 of the image IMG2 after capturing the images IMG1 and IMG2 separately by the image capturing units ICU1 and ICU2 (step 202). Next, the image capturing device 10 recognizes that an image part IP1 of the image IMG1 is corresponding to the image IMG2 via comparing the feature points between the images IMG1 and IMG2 and crops the image part IP1 to be the image IMG3 (step 204). After acquiring the images IMG2 and IMG3, the image capturing device 10 detects and compensates the non-ideal effects such as shifts and deformations of the images IMG2 and IMG3 for generating the corrected images CIMG1 and CIMG2. For example, the image capturing device 10 may separate the images IMG2 and IMG3 into a plurality of image blocks, compare the featuring points of each set of corresponding image blocks in the images IMG2 and IMG3 for detecting the non-ideal effects of each image block and compensate the non-ideal effects according to the detected results for generating the corrected images CIMG1 and CIMG2. In an example, if a deformation (e.g. a stretch) of the image IMG 3 is detected, the image capturing device 10 may change the distortion curve of the image IMG3 to compensate the deformation of the image IMG3 (steps 206 and 208). After acquiring the corrected images CIMG1 and CIMG2, the image capturing device 10 calculates the depth information according to the corrected images CIMG1 and CIMG2 (step 210). As a result, the correct depth information can be acquired without influences of the non-ideal effects.

Note that, the methods of separating the images IMG2 and IMG3 into the plurality of image blocks, comparing the featuring points of each set of corresponding image blocks in the images IMG2 and IMG3 for detecting the non-ideal effects of each image block, and calculating the depth information between the images IMG1 and IMG2 may change according to different applications and design concepts. For example, the image capturing device 10 may divide each of the images IMG1 and IMG2 into 9 (3×3) image blocks with the same size and is not limited herein. In addition, the image capturing device 10 may calculate the depth information between the images IMG1 and IMG2 by calculating the parallax of objects in CIMG1 and CIMG2, and is not limited herein. The details operations of separating the images IMG2 and IMG3 into the plurality of image blocks, comparing the featuring points of each set of corresponding image blocks in the images IMG2 and IMG3 for detecting the non-ideal effects of each image block, and calculating the depth information between the images IMG1 and IMG2 should be well-known to those skilled in the art, and are not described herein for brevity.

Figure 3:
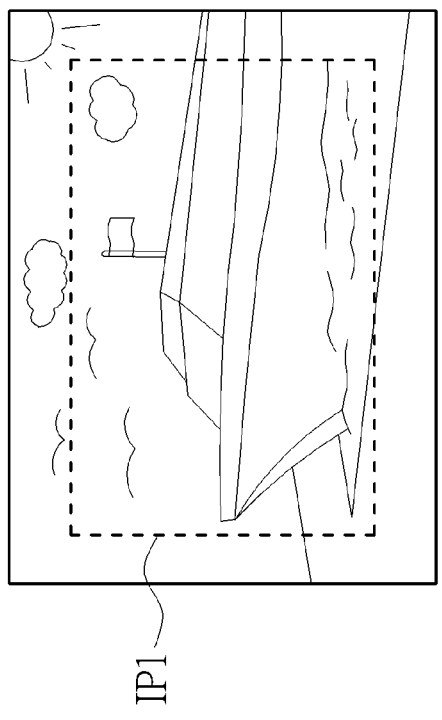
FIG. 3 is a schematic diagram of images captured by the image capturing device shown in FIG. 1.
Figure 3:
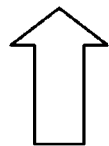
Figure 3:
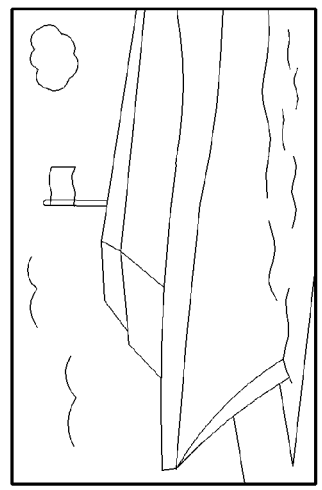
Figure 3:
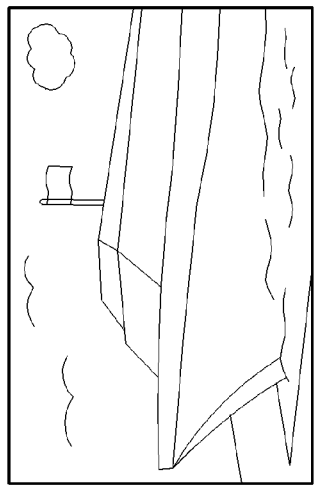
Figure 4:
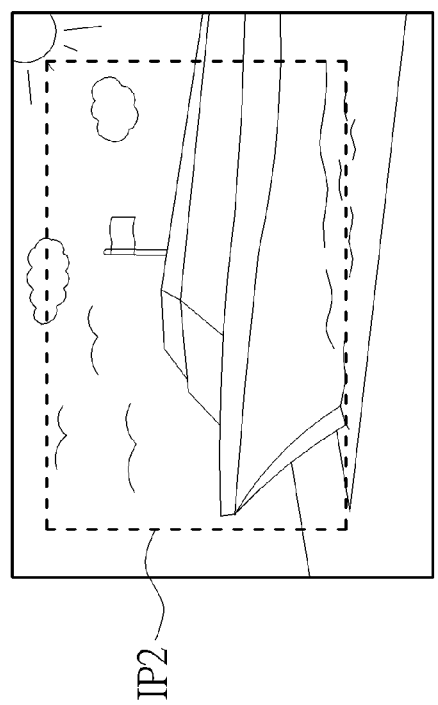
FIG. 4 is a schematic diagram of images captured by the image capturing device shown in FIG. 1.
Figure 4:
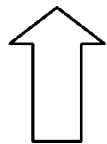
Figure 4:
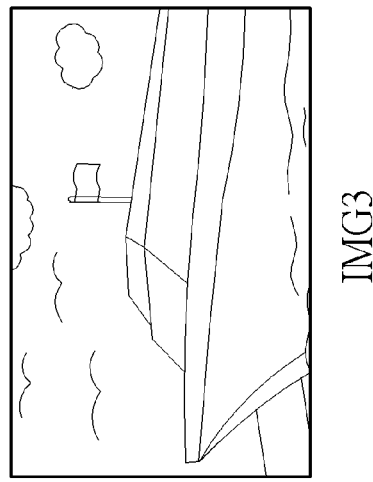
Figure 4:
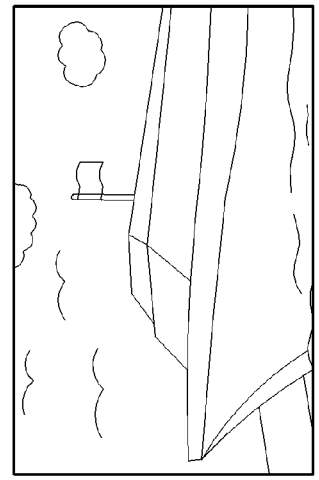

Please refer to FIG. 4, which is a schematic diagram of images IMG1 and IMG2 according to another example of the present invention. Similar to FIG. 3, the images IMG1 and IMG2 have different resolutions and sizes. Thus, the image capturing device 10 first downscales/upscales the resolution RES1 of the image IMG1 to make the resolution RES1 be the same with the resolution RES2 of the image IMG2 after capturing the images IMG1 and IMG2 separately by the image capturing units ICU1 and ICU2 (step 202). Different from FIG. 3, the image IMG2 is now corresponding to an image part IP2 in the image IMG1, which is shift upwards from the image part IP1 shown in FIG. 3 due to unexpected impacts happened on the image capturing units ICU1 and/or ICU2 (e.g. the configurations of the image capturing units ICU1 and/or ICU2 are changed after the image capturing device 10 is impacted by an external force or the image capturing device 10 is shook when capturing the images IMG1 and IMG2). If the image capturing device 10 still crops the image part IP1 of the image IMG1 as the image IMG3 for performing the following steps, the depth information would be wrong and the quality of the 3D image applying the depth information would be downgraded.

According to the method 20, the image capturing device 10 recognizes that the image part IP2 of the image IMG1 is corresponding to the image IMG2 via comparing the feature points between the images IMG1 and IMG2 and crops the image part IP2 to be the image IMG3 (step 204). In other words, the part of the image IMG1 cropped to be the image IMG3 changes each time of capturing the images IMG1 and IMG2. After acquiring the images IMG2 and IMG3, the image capturing device 10 detects and compensates the non-ideal effects of the images IMG2 and IMG3 for generating the corrected images CIMG1 and CIMG2 (steps 206 and 208). After compensating the non-ideal effects of the images IMG2 and IMG3 and acquiring the corrected images CIMG1 and CIMG2, the image capturing device 10 may therefore calculate the depth information according to the corrected images CIMG1 and CIMG2 (step 210). Since the image IMG3 is changed according to the relationships between the images IMG1 and IMG2, the correct depth information can be acquired.

Figure 5:
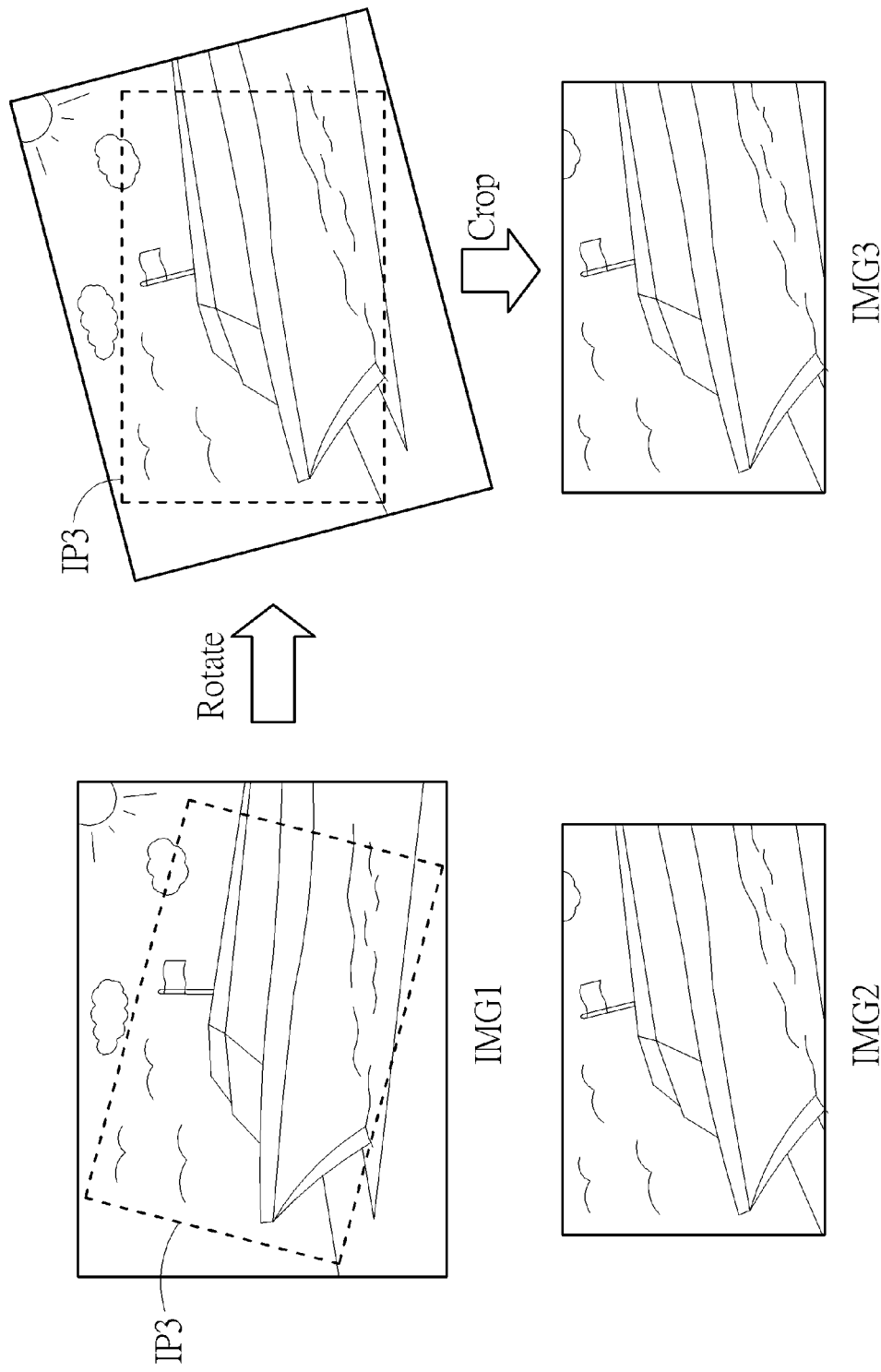
FIG. 5 is a schematic diagram of images captured by the image capturing device shown in FIG. 1.

Please refer to FIG. 5 which is a schematic diagram of images IMG1 and IMG2 according to still another example of the present invention. Similar to FIG. 3, the images IMG1 and IMG2 have different resolutions and sizes. Thus, the image capturing device 10 first downscales/upscales the resolution RES1 of the image IMG1 to make the resolution RES1 be the same with the resolution RES2 of the image IMG2 after capturing the images IMG1 and IMG2 separately by the image capturing units ICU1 and ICU2 (step 202). Different from FIG. 3, the image IMG2 is now corresponding to an image part IP3 in the image IMG1, which is crooked from the image part IP1 shown in FIG. 3 due to unexpected impacts happened on the image capturing units ICU1 and ICU2. If the image capturing device 10 still crops the image part IP1 of the image IMG1 as the image IMG3 for performing the following steps, the depth information would be wrong and the quality of the 3D image would be downgraded. Via comparing the features points between the images IMG1 and IMG2, the image capturing device 10 rotates the image IMG1, to make the image part IP3 to be horizontal. After the image IMG1 is rotated, the image capturing device 10 recognizes that the image part IP3 of the image IMG1 is corresponding to the image IMG2 via comparing the feature points between the images IMG1 and IMG2 and crops the image part IP3 to be the image IMG3 (step 204).

After acquiring the images IMG2 and IMG3, the image capturing device 10 detects and compensates the non-ideal effects of the images IMG2 and IMG3 for generating the corrected images CIMG1 and CIMG2 (steps 206 and 208). After compensating the non-ideal effects of the images IMG2 and IMG3 and acquiring the corrected images CIMG1 and CIMG2, the image capturing device 10 may therefore calculate the depth information according to the corrected images CIMG1 and CIMG2 (step 210). Since the image IMG3 is changed according to the relationships between the images IMG1 and IMG2, the correct depth information can be acquired. Note that, the image capturing device 10 may rotate the image IMG2 via comparing the features points between the images IMG1 and IMG2 in another example. That is, the image capturing device 10 may rotate at least one of the images IMG1 and IMG2 when detecting at least one of the images IMG1 and IMG2 is crooked via comparing the features points between the images IMG1 and IMG2.

Furthermore, the image capturing device 10 may adjust the depth information according to the information of capturing the images IMG1 and IMG2. For example, the image capturing device 10 may further comprise focusing units FU1 and FU2 (not shown in FIG. 1), such as voice coil motors (VCMs), for adjusting focuses F1 and F2 of the image capturing units ICU1 and ICU2, to acquire the clear images IMG1 and IMG2. When the image capturing unit ICU1 captures the images IMG1, the focusing unit FU1 adjusts the focus F1 of the image capturing unit ICU1 to focus on objects in a focusing area FA1 of the image IMG1. According to the focus F1, the image capturing device 10 may acknowledge that the distance between the image capturing device 10 and the objects in the focusing area FA1 locates within an estimated distance ED1. In such a condition, if the depth information of the focusing area FA1 in the image IMG1 is not in the estimated distance ED1 and a difference between the depth information of the focusing area FA1 and the estimated distance ED1 is enormous, the image capturing device 10 determines that the depth information may be erroneous and further adjusts the depth information according to the estimated distance ED1. Similarly, the image capturing device 10 may adjust the depth information according to an estimated distance ED2 corresponding to the focus F2 of a focusing area FA2 in the image capturing unit ICU2 when a difference between the depth information of the focusing area FA2 and the estimated distance ED2 is enormous.

In an example, the focus F1 of capturing the image IMG1 is corresponding to the estimated distance ED1 equaling 1 meters and a statistic (e.g. an average or a median) of the disparities in the depth information of the focusing area FA1 is 0.5 meters. The image capturing device 10 determines that the difference between the estimated distance ED1 and the statistic of the disparities in the depth information of the focusing area FA1 exceeds a threshold (e.g. 0.4 meters) and adjusts the depth information according to the estimated distance ED1. In this example, the image capturing device 10 normalizes the depth information according to a ratio between the estimated distance ED1 and the statistic of the disparities in the depth information of the focusing area FA1. That is, the depth information is multiplied by 2 (i.e. 1/0.5) in this example. As a result, the accurate depth information can be therefore acquired.

According to different applications and design requirements, those with ordinary skill in the art may observe appropriate alternations and modifications. For example, the images IMG1 and IMG2 may be the images contiguously acquired via the same image capturing unit. That is, the image capturing device 10 may only have single image capturing unit, and is not limited herein.

Moreover, the image capturing device 10 may need to perform a distortion correction procedure to compensate curve distortions of the image capturing units ICU1 and ICU2. For example, the curve distortions may be resulted from adopting different lens or the lens of the image capturing units ICU1 and ICU2 are deformed by the external impacts. In such a condition, the image capturing device 10 needs to perform the distortion correction procedure on the images IMG1 and IMG2 before equaling the resolution RES1 of the image IMG1 and the resolution RES2 of the image IMG2 (i.e. step 202 of the method 20 shown in FIG. 2), to compensate the curve distortions of the image capturing units ICU1 and ICU2.

Figure 6:
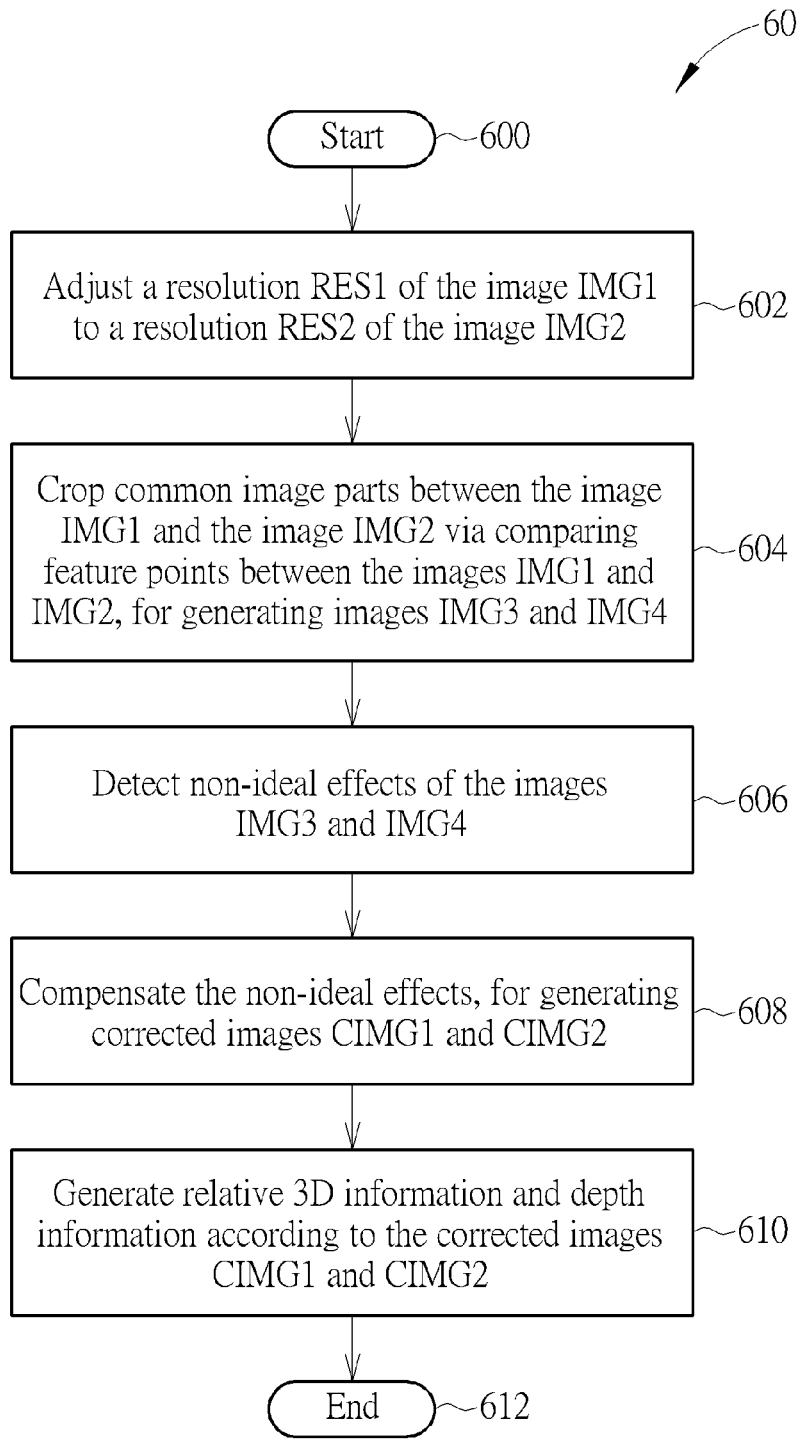
FIG. 6 is a flowchart of another method according to an example of the present invention.

In an example, both the images IMG1 and IMG2 are required to be cropped for compensating the non-ideal effects since the images IMG1 and IMG2 may equip with different view angles and contain different parts of the captured scene. Please refer to FIG. 6, which is a flowchart of a method 60 according to an example of the present invention. The method 60 is utilized in the image capturing device 10 for compensating non-ideal effects of images IMG1 and IMG2 used for acquiring depth information of a 3D image. Note that, the images IMG1 and IMG2 may be acquired by different image capturing units with different resolutions (e.g. the image capturing units ICU1 and ICU2), and are not limited herein. The method 60 can be complied into the program code 114 and comprise the following steps:

Step 600: Start.

Step 602: Adjust a resolution RES1 of the image IMG1 to a resolution RES2 of the image IMG2.

Step 604: Crop common image parts between the image IMG1 and the image IMG2 via comparing feature points between the images IMG1 and IMG2, for generating images IMG3 and IMG4.

Step 606: Detect non-ideal effects of the images IMG3 and IMG4.

Step 608: Compensate the non-ideal effects, for generating corrected images CIMG1 and CIMG2.

Step 610: Generate relative 3D information and depth information according to the corrected images CIMG1 and CIMG2.

Step 612: End.

According to the method 60, the image capturing device 10 captures the images IMG1 and IMG2 and adjusts the resolution of the image IMG1 to that of the image IMG2. The detailed operations of the step 602 are similar to those of the steps 202, and are not narrated herein for brevity. Next, via comparing the feature points between the images IMG1 and IMG2, the image capturing device 10 recognizes common image parts between the images IMG1 and IMG2 (i.e. the parts of the image IMG1 and the image IMG2 have similar feature points) and crops the common image parts of the images IMG1 and IMGs as images IMG3 and IMG4. Since the images IMG3 and IMG4 have the same resolution and the approximately same view angle, the image capturing device 10 can detect and compensate the non-ideal effects (e.g. shifts and distortions) of the images IMG3 and IMG4, for generating the corrected images CIMG1 and CIMG2. After compensating the non-ideal effects, the image capturing device 10 may therefore generate relative 3D information and calculate correct depth information (e.g. a depth map) according to the corrected images CIMG1 and CIMG2.

Figure 7:
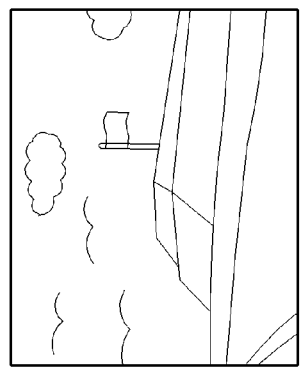
FIG. 7 is a schematic diagram of images captured by the image capturing device shown in FIG. 1.
Figure 7:
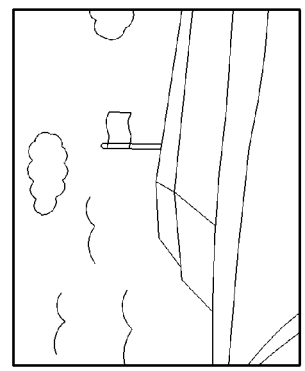
Figure 7:
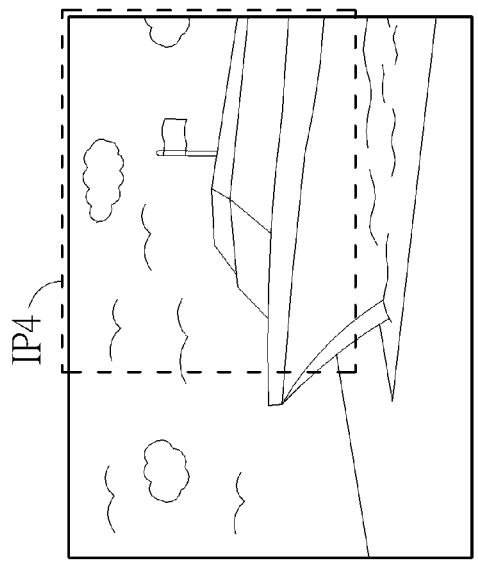
Figure 7:
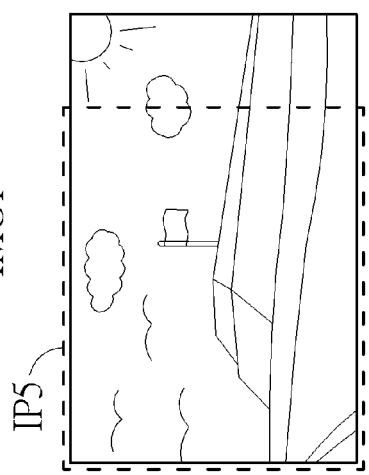

Please refer to FIG. 7, which is a schematic diagram of the images IMG1 and IMG2 according to an example of the present invention. In this example, the images IMG1 and IMG2 have different resolutions and sizes. Thus, the image capturing device 10 first downscales/upscales the resolution RES1 of the image IMG1 to make the resolution RES1 be the same with the resolution RES2 of the image IMG2 after capturing the images IMG1 and IMG2 separately by the image capturing units ICU1 and ICU2 (step 602).

In comparison with FIG. 3, the image part with the similar feature points (i.e. the common image part) in the image IMG1 is shift up-right and that in the image IMG2 is the left part of the image IMG2. If the image capturing device 10 keeps cropping the image part IP1 as the image IMG3 and does not crop the image IMG2, the relative 3D information between the images IMG1 and IMG2 acquired by the image capturing device 10 would be erroneous. Via comparing the feature points of the images IMG1 and IMG2, the image capturing device 10 acknowledges that the common parts between the images IMG1 and IMG2 are image parts IP4 and IP5 of the images IMG1 and IMG2. The image parts IP4 and IP5 are cropped as the images IMG3 and IMG4, respectively (step 604). After acquiring the images IMG3 and IMG4, the image capturing device 10 detects and compensates the non-ideal effects of the images IMG3 and IMG4 for generating the corrected images CIMG1 and CIMG2 (steps 606 and 608) and calculates the depth information according to the corrected images CIMG1 and CIMG2 (step 610). As a result, the relative 3D information (e.g. depth information) can be acquired even if the relationship between the images IMG1 and IMG2 is changed due to unexpected effects.

Please note that, the above mentioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the stereo matching device 10.

To sum up, the above examples adaptively compensate the non-ideal effects each time of capturing the image. Even if the relationship between the images used for calculating the depth information is changed due to unexpected effects, the correct depth information still can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for an image capturing device, comprising:
acquiring a first image and a second image;
adjusting a first resolution of the first image to a second resolution of the second image;
cropping a first image part corresponding to the second image in the first image via comparing feature points between the first image and the second image, for generating a third image;
detecting non-ideal effects between the second image and the third image;
compensating the non-ideal effects, for generating a first corrected image and a second corrected image;
calculating a depth information based on the first corrected image and the second corrected image; and
adjusting the depth information according to focuses of capturing the first image and the second image when a difference between an estimated distance corresponding to the focus of capturing the first image and a statistic of disparities of the depth information exceeds a threshold.

2. The method of claim 1, wherein the first image and the second image are respectively acquired by a first image capturing unit and a second image capturing unit of the image capturing device.

3. The method of claim 2, wherein the first image capturing unit and the second image capturing unit are transversely configured.

4. The method of claim 2, wherein the first image capturing unit and the second image capturing unit have different resolutions.

5. The method of claim 1, wherein the first image and the second image are captured by a same image capturing unit.

6. The method of claim 1, the step of adjusting the first resolution of the first image to the second resolution of the second image comprises:
downscaling or upscaling the first resolution of the first image to the second resolution of the second image.

7. The method of claim 1, further comprising:
compensating curve distortions of the first image and the second image before adjusting the first resolution of the first image to the second resolution of the second image.

8. An image capturing device, comprising:
a computing unit; and
a storage unit, for storing a program code used for instructing the computing unit to perform the following steps:
    acquiring a first image and a second image;
    adjusting a first resolution of the first image to a second resolution of the second image;
    cropping a first image part corresponding to the second image in the first image via comparing feature points between the first image and the second image, for generating a third image;
    detecting non-ideal effects between the second image and the third image;
    compensating the non-ideal effects, for generating a first corrected image and a second corrected image;
    calculating a depth information based on the first corrected image and the second corrected image; and
    adjusting the depth information according to focuses of capturing the first image and the second image when a difference between an estimated distance corresponding to the focus of capturing the first image and a statistic of disparities of the depth information exceeds a threshold.

9. The image capturing device of claim 8, further comprising:
    a first image capturing unit, for capturing the first image; and
    a second image capturing unit, for capturing the second image.

10. The image capturing device of claim 9, wherein the first image capturing unit and the second image capturing unit are transversely configured when capturing the first image and the second image.

11. The image capturing device of claim 9, wherein the first image capturing unit and the second image capturing unit have different resolutions.

12. The image capturing device of claim 8, wherein the first image and the second image are captured by a same image capturing unit.

13. The image capturing device of claim 8, the step of adjusting the first resolution of the first image to the second resolution of the second image comprises:
    downscaling or upscaling the first resolution of the first image to the second resolution of the second image.

14. The image capturing device of claim 8, wherein the program code further instructs the computing unit to compensate curve distortions of the first image and the second image before adjusting the first resolution of the first image to the second resolution of the second image.

* * * * *